US006357548B1

(12) United States Patent
Boyd (10) Patent No.: US 6,357,548 B1
(45) Date of Patent: Mar. 19, 2002

(54) LADDER SUPPORT DEVICE

(76) Inventor: Gary Don Boyd, 1504 Fairhaven Dr., Mansfield, TX (US) 76063

( * ) Notice: Subject to any disclaimer, the term of this patent is extended or adjusted under 35 U.S.C. 154(b) by 0 days.

(21) Appl. No.: 09/552,372

(22) Filed: Apr. 19, 2000

Related U.S. Application Data (60) Provisional application No. 60/134,710, filed on May 18, 1999.

(51) Int. Cl.[7] .............................. E06C 5/00; E06C 1/00
(52) U.S. Cl. ...................... 182/127; 182/68.1; 280/492
(58) Field of Search ............................ 182/127, 90, 92, 182/93, 88, 150, 91, 68, 97, 98, 222, 223, 119; 280/165, 166, 163, 492–494

(56) References Cited

U.S. PATENT DOCUMENTS

| | | | |
|---|---|---|---|
| 2,499,091 A | 2/1950 | Brubaker | |
| 2,586,531 A | 2/1952 | Gordon | |
| 3,043,398 A | 7/1962 | Bakula | |
| 3,621,935 A | 11/1971 | Bode | |
| 4,408,680 A | 10/1983 | Ross | |
| 4,580,660 A | 4/1986 | Oling | |
| 4,775,282 A | 10/1988 | Van Vilet | |
| 4,858,725 A | 8/1989 | Griffin | |
| 4,990,049 A | * 2/1991 | Hargrove | ................ 182/129 X |
| 5,009,350 A | * 4/1991 | Schill et al. | ............ 182/127 X |
| 5,236,062 A | 8/1993 | Laney | |
| 5,393,193 A | 2/1995 | Dagg | |
| 5,469,933 A | 11/1995 | Thomason | |
| 5,632,591 A | 5/1997 | Henriquez | |
| 5,709,274 A | * 1/1998 | Herbold | .................. 280/494 X |
| 5,743,702 A | 4/1998 | Gunderson | |
| 5,853,278 A | 12/1998 | Frantz | |
| 5,941,342 A | * 8/1999 | Lee | ........................ 182/127 X |

* cited by examiner

Primary Examiner—Daniel P. Stodola
Assistant Examiner—Hugh B. Thompson
(74) Attorney, Agent, or Firm—Stites & Harbsion, PLLC; David W. Nagle, Jr.

(57) ABSTRACT

A ladder support device attaches to a towing hitch of a vehicle, such that the ladder can be transported in an essentially horizontal position and deployed in an essentially vertical position. The ladder support device includes safety brackets that limit the range of motion of the extended ladder, a platform that provides a user with secure footing before alighting to and upon descending from the ladder, and a rotatable mount that allows the ladder support device to be moved into the proper work position.

12 Claims, 7 Drawing Sheets

LADDER SUPPORT DEVICE

CROSS-REFERENCE TO RELATED APPLICATION

This application claims priority from U.S. Provisional Application Ser. No. 60/134,710, filed May 18, 1999, which application is incorporated herein by reference in its entirety.

BACKGROUND

The present invention relates to a ladder support device that attaches to a moving vehicle, such as a panel van or pickup truck. The device, which facilitates the transport and deployment of a ladder, can be used with a relatively long extension ladder, and provides a stable support for the ladder when it is deployed and extended.

Extension ladders are commonly used to allow workers to ascend to roofs, or other high points on buildings or billboards. These extension ladders can reach to heights of about 40 feet. Relatively short ladders can generally be handled by a single individual, but with heights of 30 to 40 feet two or more persons may be required to hoist the ladder from its transportation vehicle and into position against the building. Moreover, extremely long ladders tend to be more susceptible to motion in the wind, and require the user to be extremely cautious that the center of gravity of the ladder and user is not shifted so as to cause the ladder to "kick out" or slip from its properly mounted position.

Previous attempts have been made to find relatively easy means of hoisting and mounting extension ladders, such as described in U.S. Pat. No. 2,586,531, issued to Gordon; U.S. Pat. No. 3,043,398, issued to Bakula; and U.S. Pat. No. 4,408,680, issued to Ross. Each of the above patents describe devices that allow a ladder to be transported in the horizontal position, typically resting on the top of the transporting vehicle, and then allow the ladder to be deployed into a vertical position at the work site. The device of the '531 patent includes a modified vehicle bumper with pockets which accept the feet of the ladder, and angled rails which hold the ladder in the desired upright position. The devices of the '398 and '680 patents secure the base of the essentially vertical ladder to the bumper, then rely on angled rails or cables to hold the extended ladder in position. In each of these cases, even with the ladder properly positioned, there is little support for the deployed ladder, so the user must be cautious when using the ladder in a strong breeze. Moreover, because the ladder is secured to the bumper of the transport vehicle, the vehicle must be properly positioned relative to the intended use site or the user will not be able to reach the building with the ladder in the vertical position.

Figure 1:
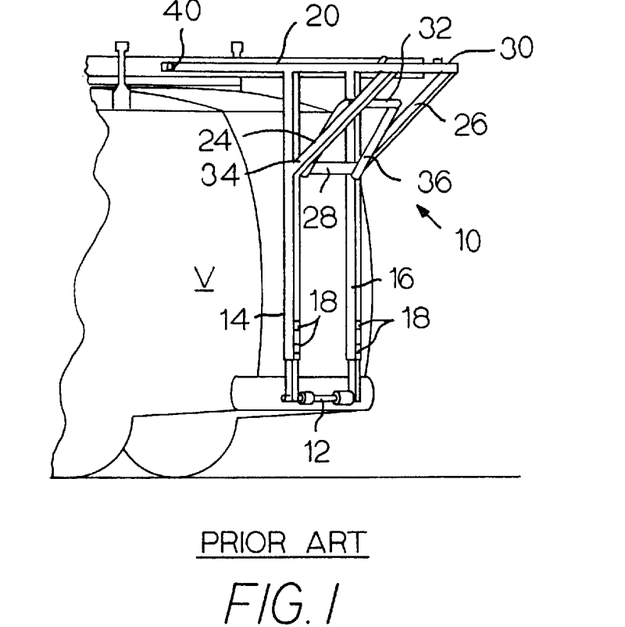
FIG. 1 is a perspective view of a prior art ladder brace in the transport position.
Figure 2:
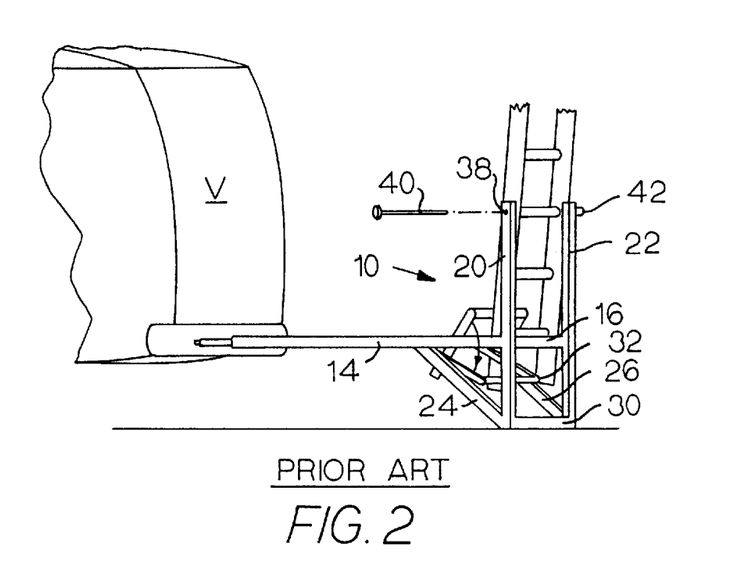
FIG. 2 is a perspective view of the prior art brace of FIG. 1 in the deployed position.

U.S. Pat. No. 4,858,725, issued to Griffin, and shown in FIGS. 1 and 2, describes a ladder brace that attaches to a moving vehicle, such as a panel van. The device includes a hinge (12) which attaches to the lower portion of a vehicle and allows the device to rotate approximately 90° (from a position parallel to the ground (open) to a position that is perpendicular to the ground (closed)). Extending from the hinge (12) is a first pair of braces (14, 16) which intersect a second pair of braces (20, 22), forming two T-shaped structures. Support braces (24, 26) further connect the first braces (14, 16) to the second braces (20, 22); and two cross-members (28, 30) are positioned between the T-shaped structures. In use, a pivot pin (40) is threaded through the rung of a metal ladder to secure the ladder to the second braces of the device. When the ladder is deployed, a safety stop (32) can be positioned to abut against the lower portion of the ladder to revent the ladder from moving.

The device of the '725 patent allows the ladder to be deployed in several positions —straight up, toward the rear of the vehicle, and away from the rear of the vehicle—and allows the ladder to be moved from the horizontal position to the vertical position by a single individual. However, the device of the '725 patent requires that the vehicle be positioned directly in front of the work site so the ladder can be deployed at the proper angle to the site; does not provide for unexpected movement of the ladder, such as having a wind from the opposite direction causing the ladder to sway backward; does not provide an easy way for the user to alight to or descend from the ladder once it is in position, rather the user must step between the braces to reach the ladder; uses only the safety stop, which is near the base of the ladder, to secure the ladder in position; and is not designed to accommodate ladders of varying widths, which are common in the industry.

Thus, it is an object of this invention to provide a ladder support device which can be secured to a vehicle, and used to transport a ladder on the vehicle in an essentially horizontal position; which can be deployed to an essentially vertical position by the user without assistance; which provides features which may be used to reduce the risk of the ladder tilting by more than a limited angular range, even in adverse weather conditions; which allows the user to easily alight to and descend from the ladder; and which can be deployed in varying angular relationships relative to the vehicle so that it is not necessary for the vehicle to be directly aligned with the intended work site.

SUMMARY OF THE PREFERRED EMBODIMENT

The present invention relates to a ladder support device that attaches to a moving vehicle, such as a panel van or pickup truck. The device includes a ladder mounting section, adaptable for variable width and length extension ladders, and having safety brackets and skid pads; and a platform leading from a rotatable latch to the ladder mounting section. The safety brackets provide that a deployed and extended ladder will have a very limited range of motion, thereby minimizing the risks of the ladder kicking out or tilting. The skid pads allow the vehicle to be repositioned slightly, with the ladder deployed, for better access to the work site. The platform allows the user to gain secure footing before alighting to and upon descending from the ladder, and the rotatable mount at the end of the catwalk allows the ladder support device to be moved through a wide arc relative to the vehicle, thus allowing the ladder support to be moved into the proper work position even if the vehicle is at an angle other than directly in front of the work site. When attached to a towing hitch of a vehicle, the ladder support device is adapted such that the ladder mounted to the support can be transported on the vehicle in an essentially horizontal position and can be deployed to an essentially vertical position by the user without assistance.

DETAILED DESCRIPTION OF THE PREFERRED EMBODIMENT

The ladder support device depicted in the various Figures is selected solely for the purposes of illustrating the invention. Other and different ladder support devices may utilize the inventive features described herein as well.

Figure 3:
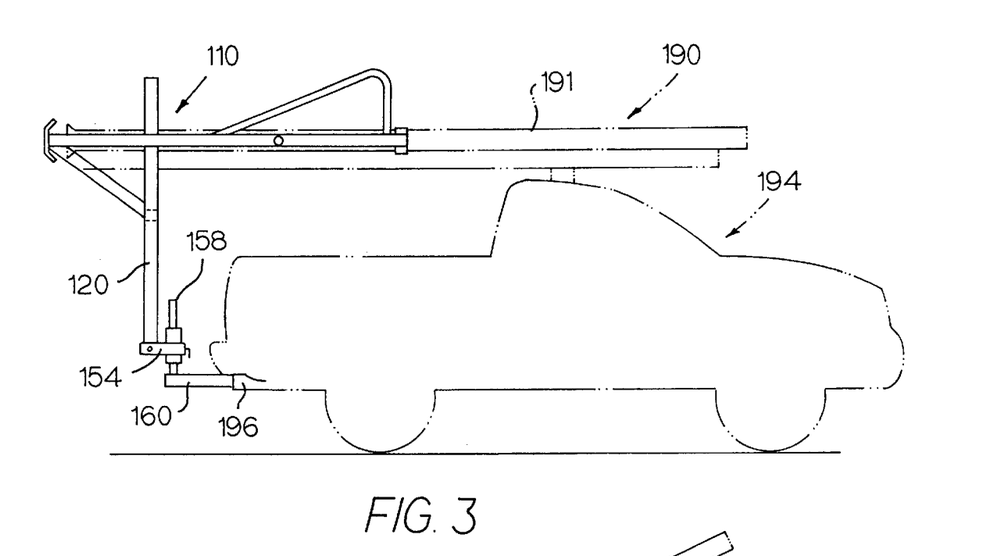
FIG. 3 is a side view of a ladder support device made in accordance with the present invention in the transport position with a vehicle and ladder shown in phantom.
Figure 4:
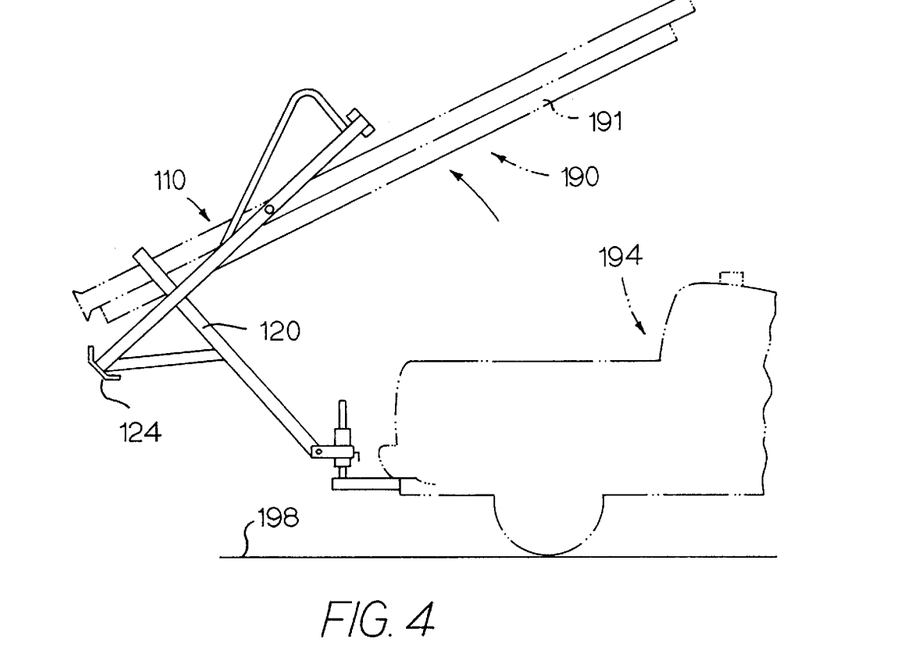
FIG. 4 is a side view of the ladder support device of FIG. 3 showing the support device as it is being deployed with a vehicle and ladder shown in phantom.
Figure 5:
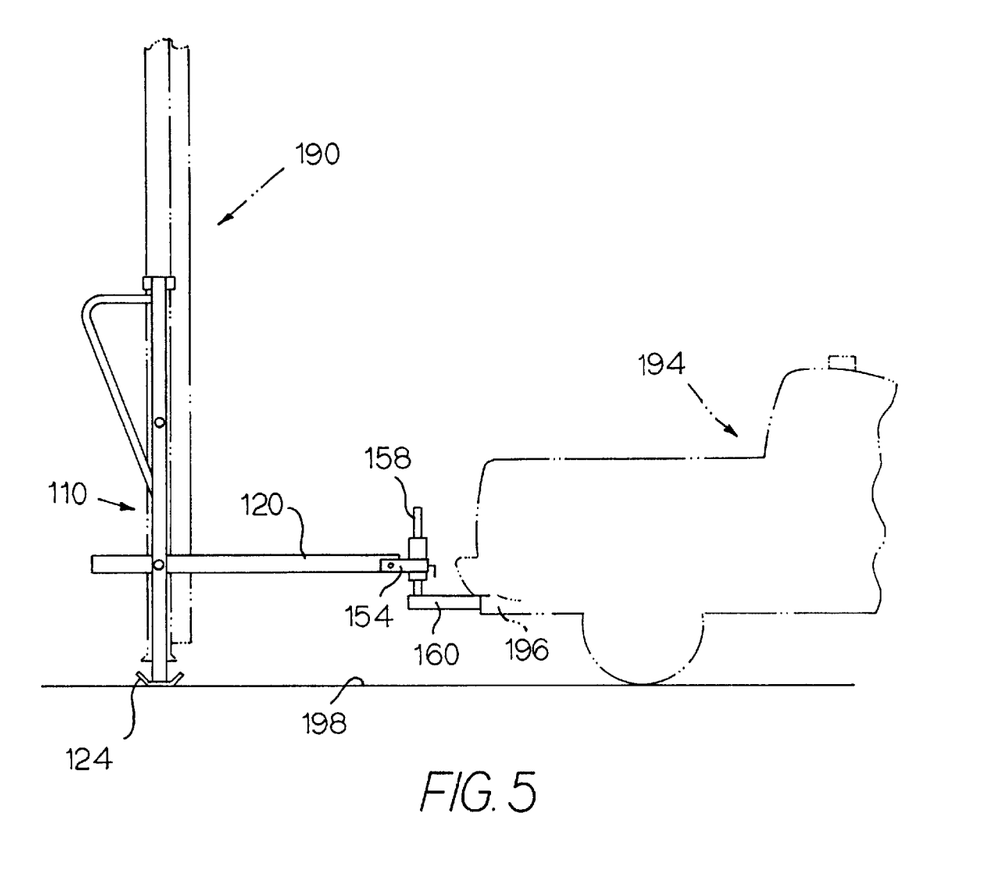
FIG. 5 is a side view of the ladder support device of FIG. 3 in the deployed position with a vehicle and ladder shown in phantom.
Figure 6:
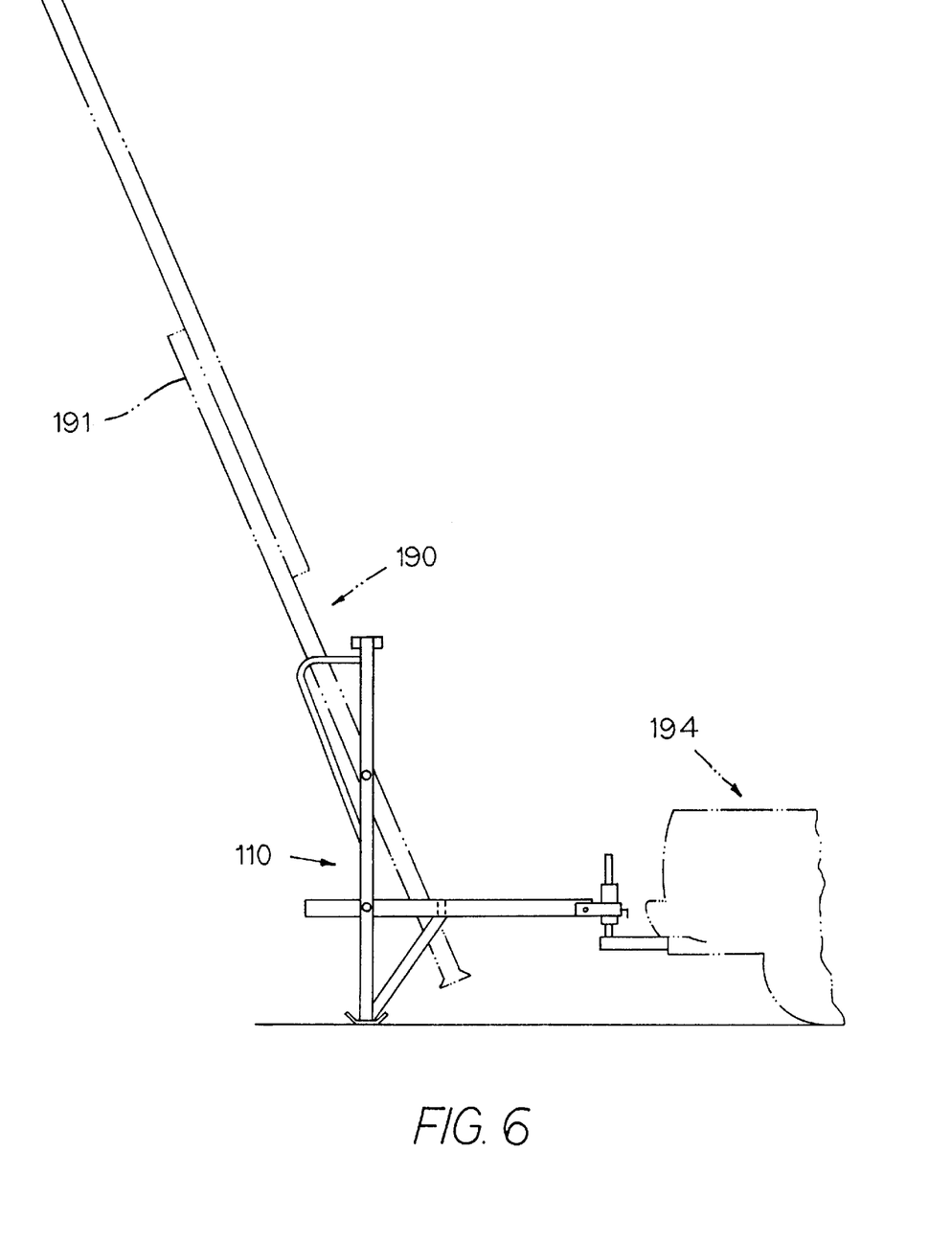
FIG. 6 is a side view of the ladder support device of FIG. 3 with the ladder positioned to reach a work site.
Figure 7:
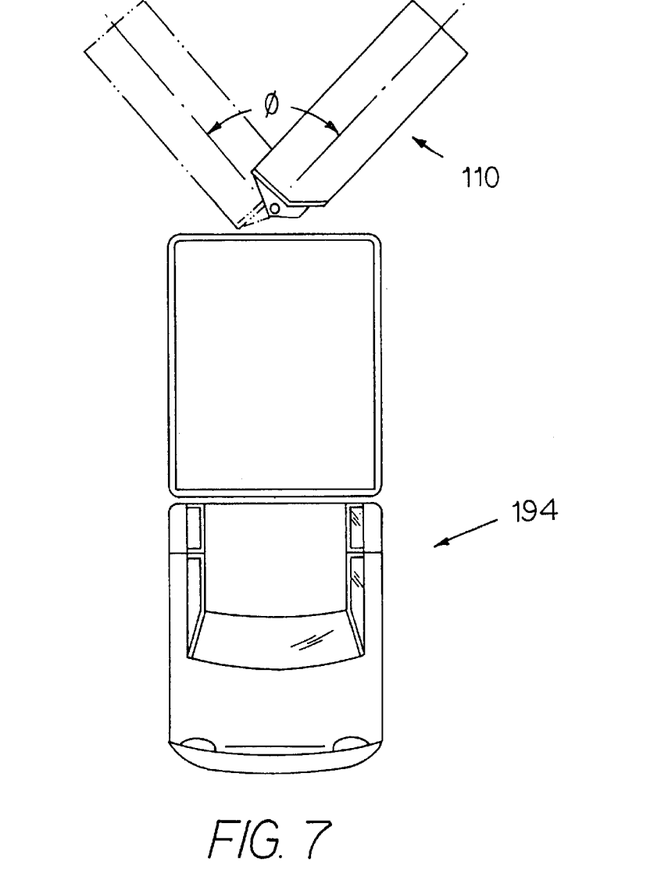
FIG. 7 is a top view of the ladder support device of FIG. 3 in the deployed position and at an angle relative to the vehicle.

Reference is first made to FIGS. 3 through 8 in which the ladder support device constructed in accordance with the present invention is generally noted by the character numeral 110. The ladder support device 110 is designed to allow the user to reversibly attach the ladder support 110 to a tow hitch 196 on a vehicle 194, and to transport a standard extension ladder 190, having side rails 191 and rungs 192 (not shown), in an essentially horizontal position on the vehicle 194, as shown in FIG. 3. Once at the work site, the user can then deploy the ladder 190 by lowering the ladder support 110, as shown in FIG. 4, until the ladder 190 is in an essentially vertical position and the feet 124, 124' of the ladder support 110 rest on the ground 198, as shown in FIG. 5. With the feet 124, 124' situated, the ladder 190 can be tilted, as shown in FIG. 6, to allow the user to reach the work area. As shown in FIG. 7, in a preferred embodiment, the ladder support 110 can be rotated relative to the vehicle 194 through a wide arc θ—from a position angled toward the passenger side of the vehicle to a position angled toward the driver side of the vehicle—thus allowing the ladder support 110 to be moved into the proper work position even if the vehicle 194 is at an angle other than directly in front of the work site.

Figure 8:
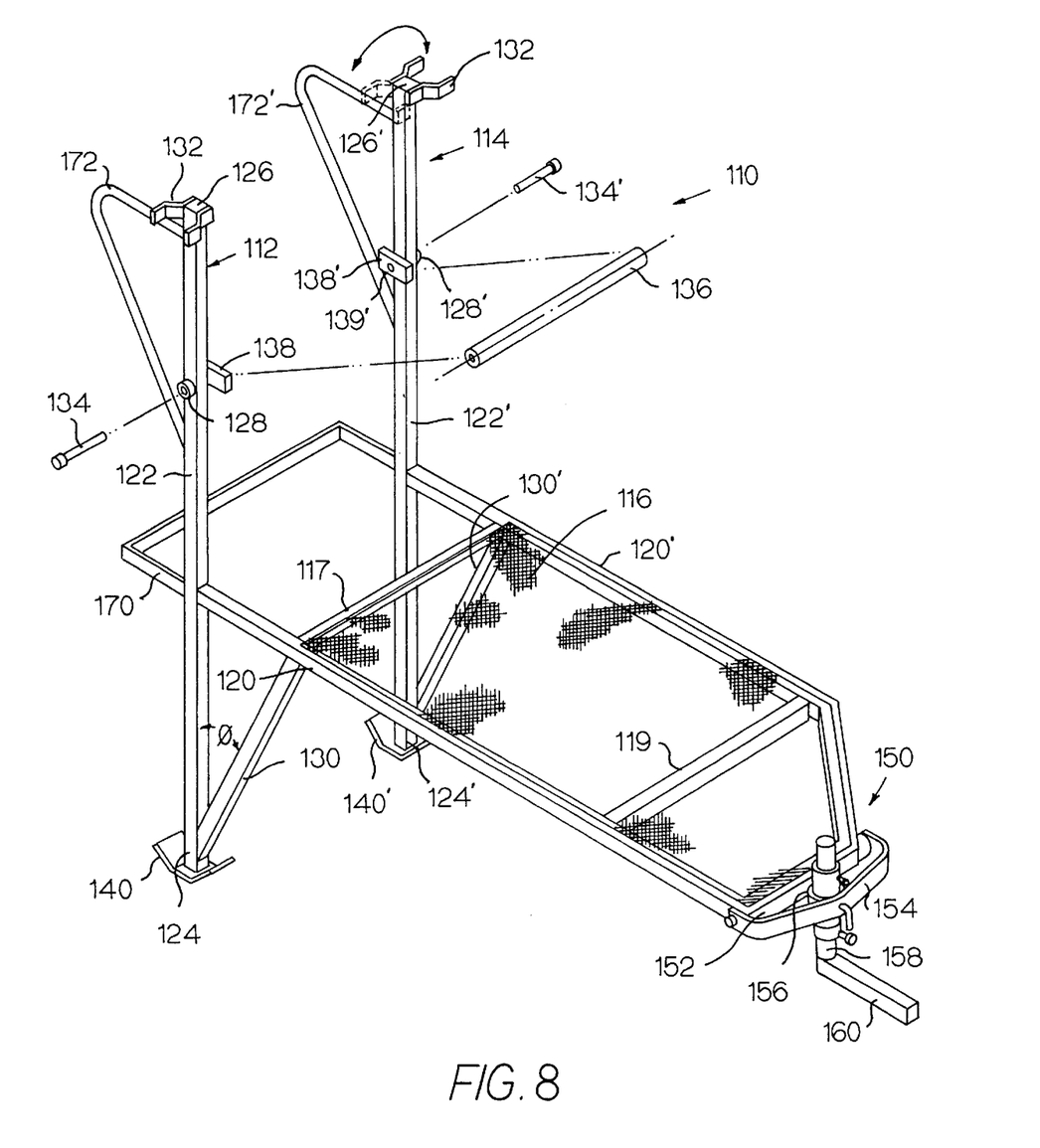
FIG. 8 is an exploded perspective view of the ladder support device of FIG. 3.

FIG. 8 shows the ladder support device 110 in greater detail. The ladder support 110 has as major components two essentially identical frames 112, 114, a platform 116, a rung mount 136, and a pair of rotatable brackets 132, 132'. The first frame 112 includes an essentially horizontal brace 120, and an essentially vertical brace 122 that forms a "T" with the horizontal brace 120, with one end of the vertical brace 122 forming a foot 124, and the opposite end forming a head 126. That is, each horizontal brace 120, 120' is secured essentially perpendicular to its respective vertical brace 122, 122' at a position intermediate the head 126, 126' and foot 124, 124' of the respective vertical brace 122, 122'. A leg support brace 130 connects the foot 124 to the horizontal brace 120. Because the leg brace 130 adds structural support to the frame, the leg brace 130 preferably forms an angle (φ) of less than about 60° with the vertical brace 122. The second frame 114 is essentially identical to the first frame 112, and includes an essentially horizontal brace 120', an essentially vertical brace 122', and a leg brace 130'. Optionally, skid pads 140, 140' may be included on the feet 124, 124' to allow the user to move the vehicle 194, and hence the ladder support 110, by several inches with the ladder support 110 in the deployed position without causing damage to the feet 124, 124' and braces 122, 122', 130, 130'.

A platform 116 is fixedly attached to the horizontal braces 120, 120' of the first and second frames 112, 114, and holds the frames 112, 114 in mirror image juxtaposition relative to each other. The platform 116 is preferably made from a material of sufficient rigidity that the ladder support user can stand on the platform 116 without causing the platform 116 to deform or collapse. Optionally, the platform 116 can be made from an open mesh material to allow the user to scrape mud or other debris from his work shoes before ascending the ladder 190. The platform 116 can be attached to the frames 112, 114 by welding, bolts, metal anchors, or by similar methods. In a preferred embodiment, the rear of the platform 116 includes a crossbar 117 mounted between the horizontal braces 120, 120'. The crossbar 117 provides additional structural support for the ladder support 110, and also creates a "kick-stop" to prevent a deployed ladder 190 from kicking out from under the user. Optionally, other crossbars 119 may be added between the braces 120, 120' under the platform 116 for additional structural support.

At the forward end of the platform 116 is a hitching section 150 that includes a bracket 154, secured to the horizontal braces 120, 120' such that the braces 120, 120' can be tilted by about 90° relative to the bracket 154, as shown in FIGS. 3 and 5; and a ring 156, positioned between the front edge 152 of the platform 116 and the bracket 154, and fixedly attached to the bracket 154. The ring 156 is used to secure the ladder support device 110 to the vehicle 194, and preferably has sufficient freedom of movement that the ring, and hence the ladder support 110, can be rotated relative to the vehicle 194 through a wide arc θ, such as shown in FIG. 7, thus allowing the ladder support 110 to be moved into the proper work position even if the vehicle 194 is at an angle relative to the work site. In a preferred embodiment, a cylindrical post 158, which fits snuggly within the ring 156, is secured to a flange 160 that connects to a tow hitch 196 mounted on the vehicle 194, and the ring 156 is held onto the post 158 with a key or similar locking device. At the work site, the key can be released to allow the ring 156 to move relative to the post 158. If necessary to create a snug fit between the ring 156 and the post 158, washers or additional rings can be added to the post 158. Different types of hitch connections may be used to secure the ladder support 110 to the vehicle 194, but preferably, the connection selected should allow the ring 156 freedom of movement through the angle θ.

Referring again to FIG. 8, on each frame 112, 114, between the head 126, 126' and the horizontal brace 120, 120' are apertures 128, 128'. Threaded bolts 134, 134' project through the apertures 128, 128', respectively, to secure a hollow cylindrical rung mount 136 between the frames 112, 114. The mount 136, which is preferably threaded internally on either end, should have an exterior diameter small enough to fit within a rung 192 of the standard extension ladder 190. When used with a ladder 190, the rung mount 136 is slipped within a rung 192 of the ladder 190, the ladder 190 is positioned between the frames 112, 114, and the bolts 134, 134' are passed through the apertures 128, 128' and tightened within the respective ends of the rung mount 136, thereby holding the ladder 190 onto the ladder support 110. Because ladders can vary in width, typically from about 17 inches to about 21 inches, the ladder support 110 is designed to accommodate the wider ladders without any modification. However, to provide narrower ladders with a relatively tight fit between the ladder 190 and the frames 112, 114, optionally one or more spacers 138, each having an aperture 139 large enough to fit over the rung mount 136, may be added to the rung mount 136. When spacers 136 are used, the ladder 190 positioning procedure is essentially the same as noted above, except that the spacers 138 are added to the rung mount 136 before the ladder 190 is slipped between the frames 112, 114, and the bolts are then attached to the rung mount 136.

Near the head 126, 126' of each frame 112, 114 is attached a movable bracket 132, 132', respectively. Each bracket 132, 132' has a "C"-shape, with the width of the "C" preferably being large enough to accommodate the side rail 191 of the ladder 190, such as shown in FIG. 5, and can be moved relative to its respective frame 112, 114 such that the bracket 132, 132' can rest inwardly, i.e. between the frames 112, 114 and essentially over the rung mount 136, or outwardly, i.e. away from the rung mount 136. The brackets 132, 132' may be attached to their respective frames 112, 114 using any known fastening devices that will allow the brackets 132, 132' to flip over the frames 112, 114, such as metal brads, screws, or similar fastening devices. The brackets 132, 132' serve two functions on the ladder support device 110. When the ladder 190 is secured for transport, the brackets 132, 132' are rested away from the rails 191 of the ladder 190 so the ladder 190 can tilt slightly as the ladder support device 110 is moved from the transport to the deployed position, or vice versa, such as shown in FIG. 4. This tilting of the ladder 190 has been found to make deployment and stowing of the ladder 190 easier for the user. When the ladder 190 is tilted into position at the work site, as shown in FIG. 6, the brackets 132, 132' are turned inwardly (toward the ladder) to prevent the ladder 190 from tilting backward by more than a limited amount even in a very strong wind, i.e. the brackets 132, 132' stop the backward movement of the ladder 190 by creating a blockade that limits the ladder's 190 motion.

To make the ladder support device 110 easier to move from the transport position to the deployed position, one or more handles may optionally be attached to the frames 112, 114. In a preferred embodiment, a first handle 170 projects from the vertical braces 122, 122' away from the platform 116, but in essentially the same plane as the platform 116, and a pair of handles 172, 172' projects from near the heads 126, 126' of the vertical braces 122, 122', away from the platform 116. The handles 170, 172, 172' provide grips for the user to hold as the ladder support 110 is lowered from or returned to the transport position. Although the handles are not required for the ladder support device 110 to function as intended, the handles facilitate the deployment of the ladder support 110 allowing even relatively small users to deploy the support 110 without assistance.

Figure 9:
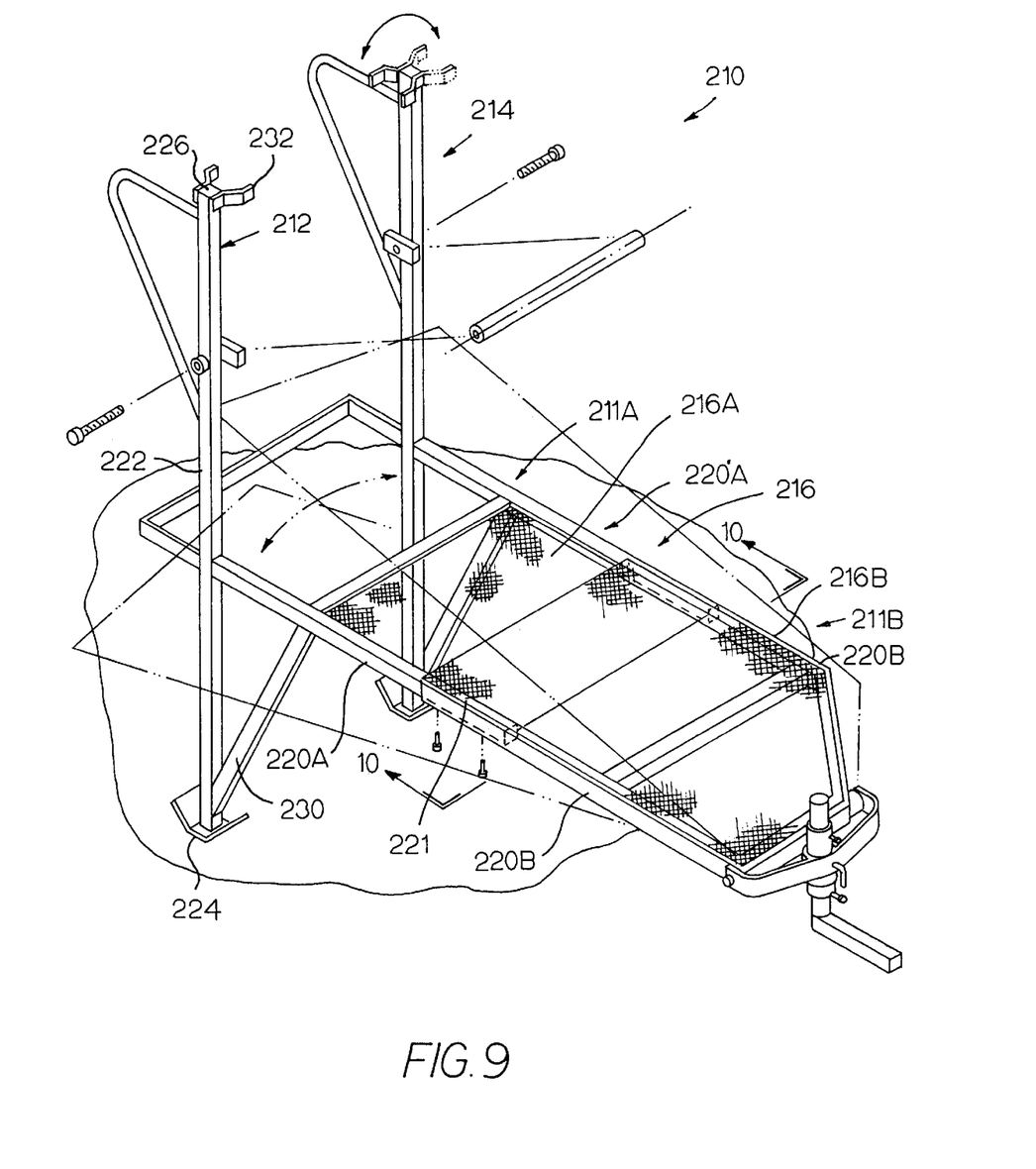
FIG. 9 is an exploded perspective view of an alternative embodiment of a ladder support device made in accordance with the present invention.
Figure 10:
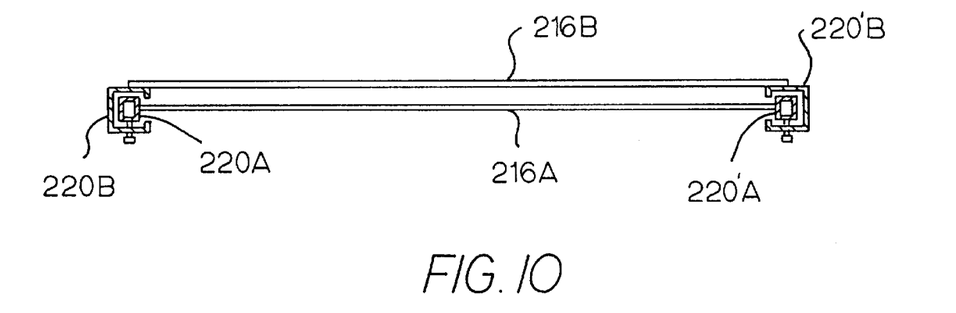
FIG. 10 is a cross-section of the platform piece of FIG. 9 taken along line 10—10.

FIGS. 9 and 10 show an alternative embodiment 210 of the ladder support device 110 of FIGS. 3–8. The device 210 is essentially identical to the ladder support device 110 except that the platform 216 and horizontal braces 220, 220' are divided into two units, 211A, 211B, having platforms 216A, 216B, and horizontal braces 220A, 220B, 220'A, 220'B. One pair of braces 220A, 220'A has slightly smaller exterior dimensions than the second pair of braces 220B, 220'B, so that the smaller braces 220A, 220'A can slide into the larger braces 220B, 220'B as though fitting within sleeves, and creating an overlap region 221. In the overlap region 221, the platform 216A attached to the smaller braces 220A, 220'A slides under the larger brace platform 216B. The units 211A, 211B can be held together at the overlap region 221 by screws, bolts, or similar fasteners that allow the user to adjust the degree of overlap 221. Having the platform 216 divided allows the user to put the ladder support device 210 in the transport position on the user's vehicle, then to adjust the length of the platform 216 to best fit that particular vehicle so that the ladder 190 and ladder support 210 can lie essentially horizontal on the vehicle during transport, regardless of the vehicle's height.

It is understood that, in light of a reading of the foregoing description and drawings, those with ordinary skill in the art will be able to make changes and modifications to the present invention without departing from the spirit or scope of the invention, as defined herein.

What is claimed is:

1. A ladder support device for transporting an extension ladder having rails and rungs on a vehicle and for supporting the ladder in a deployed position, the ladder being transported and deployed while mounted to said ladder support device, said ladder support device comprising:
   a first frame, including:
      an essentially horizontal brace;
      an essentially vertical brace defining a foot at a first end thereof and a head at a second end thereof, said horizontal brace being secured to the vertical brace at a position intermediate the head and the foot of said vertical brace; and
      a pivotable bracket mounted adjacent to the head of said vertical brace, said pivotable bracket being adapted to selectively engage the rail of said ladder supported by said ladder support device;
   a second frame essentially identical to said first frame, and spaced a predetermined distance from said first frame;
   a platform secured to the horizontal braces of said first and second frames;
   a mount adapted to be fit though a particular rung of said ladder supported by said ladder support device, thereby mounting said ladder to the ladder support device, said mount being held between the respective vertical braces of said first and second frames and positioned approximately halfway between the respective heads of said vertical braces and said horizontal braces; and
   a hitching section secured to a forward end of said platform for attaching said ladder support device to said vehicle, said hitching section being adapted to allow for rotation of the ladder support device about:
      a first pivot axis substantially parallel to a plane defined by the platform, thereby allowing a user to manipulate said ladder support device from a transport position to a deployment position, and
      a second substantially vertical pivot axis, thereby allowing the user to move said ladder support device relative to said vehicle through an arc of a predetermined angle.

2. The ladder support device of claim 1, wherein each pivotable bracket has a generally C-shaped configuration.

3. The ladder support of claim 1, wherein the platform has an open mesh pattern.

4. The ladder support device of claim 1, wherein the mount is an elongated member having a generally cylindrical shape, and further includes internal threads at the respective distal ends thereof for receiving threaded fasteners, thereby securing said mount to the vertical braces of said first and second frames.

5. The ladder support device of claim 4, and further comprising at least one spacer, said spacer defining an aperture of sufficient diameter to allow said spacer to be fit onto and around said mount.

6. The ladder support device of claim 1, and further comprising skid pads attached to the respective feet of the vertical braces of said first and second frames.

7. The ladder support device of claim 1, and further comprising at least one crossbar secured between the horizontal braces of said first and second frames and under said platform, thereby providing additional structural support to said platform.

8. The ladder support device of claim 1, and further comprising at least one handle secured to at least one vertical brace and projecting away from said platform, thereby allowing a user to manipulate the ladder support device from said transport position to said deployment position.

9. The ladder support device of claim 1, in which a leg support brace connects the foot of the vertical brace of said first frame to the horizontal brace of said first frame, and a leg support brace connects the foot of the vertical brace of said second frame to the horizontal brace of said second frame.

10. A combination of a ladder and a ladder support device, said ladder support device facilitating transport of said ladder on a vehicle, and further supporting said ladder in a deployed position, said ladder support device comprising:
   a first frame, including:
      an essentially horizontal brace;
      an essentially vertical brace defining a foot at a first end thereof and a head at a second end thereof, said horizontal brace being secured to the vertical brace at a position intermediate the head and the foot of said vertical brace; and
      a pivotable bracket having a generally C-shaped configuration and mounted adjacent to the head of said vertical brace, each said pivotable bracket adapted to selectively engage a respective rail of said ladder;
   a second frame essentially identical to said first frame, and spaced a predetermined distance from said first frame;
   a platform secured to the horizontal braces of said first and second frames;
   a mount adapted to be fit though a particular rung of said ladder, thereby mounting said ladder to the ladder support device, said mount being held between the respective vertical braces of said first and second frames and positioned approximately halfway between the respective heads of said vertical braces and said horizontal braces; and
   a hitching section secured to a forward end of said platform for attaching said ladder support device to said vehicle, said hitching section being adapted to allow for rotation of the ladder support device about a first pivot axis substantially parallel to a plane defined by the platform, thereby allowing a user to manipulate said ladder support device from a transport position to a deployment position;
   wherein each of said pivotable brackets can be pivoted away from the rails of the ladder during deployment or stowing thereof, thereby allowing a user to tilt the ladder relative to said ladder support device to facilitate deployment or stowing.

11. The combination of a ladder and a ladder support device of claim 10, wherein said hitching section is further adapted to allow for rotation of the ladder support device about a second substantially vertical pivot axis, thereby allowing the user to move said ladder support device relative to said vehicle through an arc of a predetermined angle.

12. A combination of a ladder and a ladder support device, said ladder support device facilitating transport of said ladder on a vehicle, and further supporting said ladder in a deployed position, said ladder support device comprising:
   a first frame, including:
      an essentially horizontal brace;
      an essentially vertical brace defining a foot at a first end thereof and a head at a second end thereof, said horizontal brace being secured to the vertical brace at a position intermediate the head and the foot of said vertical brace; and
      a pivotable bracket mounted adjacent to the head of said vertical brace, each said pivotable bracket adapted to selectively engage a respective rail of said ladder;
   a second frame essentially identical to said first frame, and spaced a predetermined distance from said first frame;
   a platform secured to the horizontal braces of said first and second frames;
   a mount adapted to be fit though a particular rung of said ladder, thereby mounting said ladder to the ladder support device, said mount being held between the respective vertical braces of said first and second frames and positioned approximately halfway between the respective heads of said vertical braces and said horizontal braces; and
   a hitching section secured to a forward end of said platform for attaching said ladder support device to said vehicle, said hitching section being adapted to allow for rotation of the ladder support device about:
      a first pivot axis substantially parallel to a plane defined by the platform, thereby allowing a user to manipulate said ladder support device from a transport position to a deployment position, and
      a second substantially vertical pivot axis, thereby allowing the user to move said ladder support device relative to said vehicle through an arc of a predetermined angle.

* * * * *